United States Patent
Kapure (10) Patent No.: US 10,807,025 B2
(45) Date of Patent: Oct. 20, 2020

(54) BLIND ATTACHMENT INTERFACE FOR FILTER HOUSING ASSEMBLY

(71) Applicant: WHIRLPOOL CORPORATION, Benton Harbor, MI (US)

(72) Inventor: Narendra A. Kapure, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 26 days.

(21) Appl. No.: 16/055,530

(22) Filed: Aug. 6, 2018

(65) Prior Publication Data

US 2020/0038790 A1   Feb. 6, 2020

(51) Int. Cl.
  *B01D 35/30*   (2006.01)
  *B01D 29/13*   (2006.01)
  *F25D 23/12*   (2006.01)

(52) U.S. Cl.
  CPC .......... *B01D 35/306* (2013.01); *B01D 29/13* (2013.01); *F25D 23/126* (2013.01); *F25D 2323/121* (2013.01); *F25D 2400/18* (2013.01)

(58) Field of Classification Search
  CPC ..... B01D 35/306; B01D 29/13; F25D 23/126; F25D 2400/18; F25D 2323/121
  USPC ................. 210/251, 282, 167.32, 171, 257.1
  See application file for complete search history.

(56) References Cited

U.S. PATENT DOCUMENTS

| | | |
|---|---|---|
| 2,955,712 A | 10/1960 | Janusz |
| 3,388,801 A | 6/1968 | Boyd et al. |
| 3,557,958 A | 1/1971 | Baldwin |
| 3,774,764 A | 11/1973 | Baldwin |
| 3,855,128 A | 12/1974 | Shaltz et al. |
| 3,980,457 A | 9/1976 | Smith |
| 4,052,307 A | 10/1977 | Humbert, Jr. |
| 4,299,699 A | 11/1981 | Boogay |
| 4,398,562 A | 8/1983 | Saarem et al. |
| 4,601,821 A | 7/1986 | Sherman et al. |
| 4,608,166 A | 8/1986 | Cain |
| 4,615,812 A | 10/1986 | Darling |
| 4,735,716 A | 4/1988 | Petrucci et al. |
| 4,764,275 A | 8/1988 | Robichaud |
| 4,915,831 A | 4/1990 | Taylor |

(Continued)

FOREIGN PATENT DOCUMENTS

| | | |
|---|---|---|
| CN | 2889448 Y | 4/2007 |
| DE | 102006034943 A1 | 1/2008 |

(Continued)

*Primary Examiner* — Madeline Gonzalez
(74) *Attorney, Agent, or Firm* — Price Heneveld LLP (57) ABSTRACT

A filter housing assembly includes a base unit configured for supporting a removable filter unit. The base unit defining a first receiving cavity having an inside profile inwardly tapered in a first lateral direction in first and second planes positioned normal to each other and intersecting along an axis extending in the first lateral direction. The assembly further includes a bezel unit having a front fascia extending generally parallel to the first plane to a first edge. The bezel unit further defines a first attachment leg extending from a first position inward of the first edge and having a foot with an exterior profile inwardly tapered in the first direction and removably received within the first receiving cavity with the exterior profile in contact with the inside profile of the cavity along respective portions intersected by the first and second planes.

20 Claims, 8 Drawing Sheets

(56) References Cited

U.S. PATENT DOCUMENTS

| | | |
|---|---|---|
| 4,935,135 A | 6/1990 | Nakashima et al. |
| 4,956,086 A | 9/1990 | Thomsen et al. |
| 5,019,251 A | 5/1991 | Sundholm |
| D322,836 S | 12/1991 | Petrucci et al. |
| 5,114,572 A | 5/1992 | Hunter et al. |
| 5,133,382 A | 7/1992 | Nielsen |
| 5,139,050 A | 8/1992 | Otto |
| 5,273,255 A | 12/1993 | Klicek et al. |
| 5,350,506 A | 9/1994 | Dombek et al. |
| 5,362,390 A | 11/1994 | Widenhoefer et al. |
| D356,625 S | 3/1995 | Petrucci et al. |
| 5,456,830 A | 10/1995 | Stanford et al. |
| 5,560,824 A | 10/1996 | Sann et al. |
| 5,567,310 A | 10/1996 | Nakashima |
| 5,567,311 A | 10/1996 | Jang |
| 5,591,332 A | 1/1997 | Reid et al. |
| 5,607,582 A | 3/1997 | Yamazaki et al. |
| 5,611,923 A | 3/1997 | Suri et al. |
| 5,653,871 A | 8/1997 | Thomsen |
| 5,698,093 A | 12/1997 | Pyle et al. |
| 5,800,702 A | 9/1998 | Taylor-McCune et al. |
| 5,826,854 A | 10/1998 | Janvrin et al. |
| 5,846,417 A | 12/1998 | Jiang et al. |
| 5,858,227 A | 1/1999 | Stone et al. |
| 5,914,037 A | 6/1999 | Yen et al. |
| 6,000,674 A | 12/1999 | Chen |
| 6,024,869 A | 2/2000 | Stifelman |
| 6,027,644 A | 2/2000 | Magnusson et al. |
| 6,068,770 A | 5/2000 | Niermeyer et al. |
| 6,132,176 A | 10/2000 | Higgins |
| D435,631 S | 12/2000 | Janik et al. |
| RE37,216 E | 6/2001 | Koslow |
| 6,241,132 B1 | 6/2001 | Morrison |
| 6,303,031 B1 | 10/2001 | Senner |
| 6,337,015 B1 | 1/2002 | Poirier |
| 6,360,764 B1 | 3/2002 | Fritze |
| 6,423,222 B1 | 7/2002 | Shively et al. |
| 6,458,269 B1 | 10/2002 | Bassett et al. |
| D472,299 S | 3/2003 | Fritze |
| D472,604 S | 4/2003 | Fritze |
| 6,579,455 B1 | 6/2003 | Muzik et al. |
| 6,632,355 B2 | 10/2003 | Fritze |
| D484,568 S | 12/2003 | Janik et al. |
| 6,789,691 B2 | 9/2004 | Martin et al. |
| 6,936,084 B2 | 8/2005 | Schlensker et al. |
| 6,977,039 B2 | 12/2005 | Knoll et al. |
| 7,000,894 B2 | 2/2006 | Olson et al. |
| 7,067,054 B2 | 6/2006 | Fritze |
| 7,147,772 B2 | 12/2006 | Fritze |
| 7,147,773 B2 | 12/2006 | Mitchell et al. |
| 7,326,342 B2 | 2/2008 | Richmond et al. |
| D567,898 S | 4/2008 | Miller |
| 7,407,148 B2 | 8/2008 | Bassett et al. |
| 7,442,301 B2 | 10/2008 | Huda |
| 7,459,078 B2 | 12/2008 | Klein et al. |
| 7,481,926 B2 | 1/2009 | Dworatzek |
| 7,481,928 B2 | 1/2009 | Fritze |
| D599,880 S | 9/2009 | Rampen et al. |
| 7,610,932 B2 | 11/2009 | Olson et al. |
| 7,638,042 B2 | 12/2009 | Astle et al. |
| 7,695,619 B2 | 4/2010 | Kurth et al. |
| 7,744,758 B2 | 6/2010 | Dworatzek et al. |
| 7,763,170 B2 | 7/2010 | Bassett et al. |
| 7,799,220 B2 | 9/2010 | Fritze |
| 7,900,769 B1 | 3/2011 | Chen |
| 7,909,999 B2 | 3/2011 | Noh et al. |
| 7,955,500 B2 | 6/2011 | Abdalla et al. |
| 7,959,010 B2 | 6/2011 | Hawkins et al. |
| 8,032,422 B2 | 10/2011 | Pickard |
| 8,070,945 B2 | 12/2011 | Stankowski et al. |
| 8,097,061 B2 | 1/2012 | Smith et al. |
| 8,097,156 B2 | 1/2012 | Tubby et al. |
| 8,097,158 B2 | 1/2012 | Tubby et al. |
| 8,118,997 B2 | 2/2012 | Ebrom et al. |
| 8,236,176 B2 | 8/2012 | Fall et al. |
| 8,245,851 B2 | 8/2012 | Hawkins et al. |
| 8,268,170 B2 | 9/2012 | Core et al. |
| 8,333,818 B2 | 12/2012 | Foerster et al. |
| 8,354,024 B2 | 1/2013 | Ihle et al. |
| 8,356,716 B1 | 1/2013 | Kruckenberg et al. |
| 8,366,930 B2 | 2/2013 | Huda et al. |
| 8,393,167 B2 | 3/2013 | Krause et al. |
| 8,398,853 B2 | 3/2013 | An et al. |
| 8,413,818 B1 | 4/2013 | Kruckenberg et al. |
| 8,442,042 B2 | 5/2013 | McCoy |
| 8,454,826 B2 | 6/2013 | Donnelly et al. |
| 8,562,830 B2 | 10/2013 | Reid |
| 8,580,109 B2 | 11/2013 | Kruckenberg et al. |
| 8,591,736 B2 | 11/2013 | Kruckenberg et al. |
| 8,709,246 B2 | 4/2014 | Branscomb |
| 8,887,324 B2 | 11/2014 | Klicpera |
| 8,911,623 B2 | 12/2014 | Tubby et al. |
| 8,950,052 B2 | 2/2015 | Kruckenberg et al. |
| 9,044,695 B2 | 6/2015 | Sann et al. |
| 9,157,677 B2 | 10/2015 | Mitchell |
| 9,211,488 B2 | 12/2015 | South et al. |
| 9,345,995 B2 | 5/2016 | Tubby et al. |
| 9,494,362 B2 | 11/2016 | Lim et al. |
| 9,533,243 B2 | 1/2017 | Kruckenberg et al. |
| 9,687,762 B2 | 6/2017 | Tubby et al. |
| 2002/0166805 A1 | 11/2002 | Minns et al. |
| 2004/0211931 A1 | 10/2004 | Olson et al. |
| 2005/0252841 A1 | 11/2005 | Bassett et al. |
| 2006/0060512 A1 | 3/2006 | Astle et al. |
| 2006/0070942 A1 | 4/2006 | An |
| 2006/0169629 A1 | 8/2006 | Donnelly et al. |
| 2006/0191827 A1 | 8/2006 | Fritze |
| 2006/0272995 A1 | 12/2006 | Fritze |
| 2007/0012611 A1 | 1/2007 | An |
| 2007/0227959 A1 | 10/2007 | Sinur et al. |
| 2007/0239461 A1 | 10/2007 | Poninski et al. |
| 2007/0295667 A1 | 12/2007 | Ruprecht |
| 2008/0000820 A1 | 1/2008 | Mitchell |
| 2008/0060982 A1 | 3/2008 | Krause et al. |
| 2008/0078710 A1 | 4/2008 | Larkner |
| 2008/0078723 A1 | 4/2008 | Larkner |
| 2008/0123297 A1 | 5/2008 | Tilton et al. |
| 2008/0185330 A1 | 8/2008 | Sinur et al. |
| 2008/0223775 A1 | 9/2008 | An |
| 2009/0045926 A1 | 2/2009 | Ebrom et al. |
| 2009/0293528 A1 | 12/2009 | Buchstab et al. |
| 2009/0321340 A1 | 12/2009 | Rampen et al. |
| 2010/0018238 A1 | 1/2010 | Gerner et al. |
| 2010/0102082 A1 | 4/2010 | Ebrom et al. |
| 2010/0131082 A1 | 5/2010 | Chandler |
| 2010/0264078 A1 | 10/2010 | Bassett et al. |
| 2011/0147297 A1 | 6/2011 | Core et al. |
| 2011/0174705 A1 | 7/2011 | Branscomb |
| 2011/0192782 A1* | 8/2011 | Tubby .................. B01D 29/96 210/234 |
| 2012/0000858 A1 | 1/2012 | Butler et al. |
| 2012/0145621 A1 | 6/2012 | Tubby et al. |
| 2013/0068682 A1 | 3/2013 | Kruckenberg et al. |
| 2013/0068683 A1 | 3/2013 | Kruckenberg et al. |
| 2013/0068684 A1 | 3/2013 | Kruckenberg et al. |
| 2014/0138292 A1 | 5/2014 | Kruckenberg et al. |
| 2014/0144819 A1 | 5/2014 | Verdegan et al. |
| 2017/0056794 A1 | 3/2017 | Chernov et al. |
| 2017/0259195 A1 | 9/2017 | Mitchell |

FOREIGN PATENT DOCUMENTS

| | | |
|---|---|---|
| GB | 2346568 A | 8/2000 |
| WO | 0134272 A1 | 5/2001 |
| WO | 2010056711 A2 | 5/2010 |
| WO | 2010070102 A1 | 6/2010 |
| WO | 2011047754 A1 | 4/2011 |

* cited by examiner

BLIND ATTACHMENT INTERFACE FOR FILTER HOUSING ASSEMBLY

BACKGROUND

The present device generally relates to a filter housing assembly for use in a refrigerator or similar appliance. Specifically, the assembly includes mutually engaging features that facilitate blind assembly between elements by aligning the elements during assembly.

Various types of assemblies in appliances and the like include elements that are used to hide or otherwise obscure internal components of the appliance, including by defining a fascia or the like that extends outwardly in multiple directions. In such instances, the component to be obscured may be the component to which the element attaches.

SUMMARY

In at least one aspect, an appliance includes a filter housing assembly includes a base unit configured for supporting a removable filter unit. The base defining a first receiving cavity having an inside profile inwardly tapered in a first lateral direction in first and second planes positioned normal to each other and intersecting along an axis extending in the first lateral direction. The assembly further includes a bezel unit having a front fascia extending generally parallel to the first plane to a first edge. The fascia defines a filter opening spaced inwardly from the first edge. The bezel unit further defines a first attachment leg extending from a first position inward of the first edge and having a foot with an exterior profile inwardly tapered in the first and second lateral directions and removably received within the first receiving cavity with the exterior profile in contact with the inside profile of the cavity along respective portions intersected by the first and second planes.

In at least another aspect, a refrigerator includes a component housing at least partially defined by an inner liner of the refrigerator, the component housing defining an opening and a filter support unit mounted within the component housing adjacent the opening and configured for retaining a removable filter unit. The support unit defines a first receiving cavity having an inside profile inwardly tapered in a first lateral direction in first and second planes positioned normal to each other and intersecting along an axis extending in the first lateral direction. The refrigerator further includes a bezel unit having a front fascia extending generally parallel to the first plane within the opening of the component unit. The fascia defines a filter opening in communication with a portion of the filter support unit. The bezel unit further defines a first attachment leg extending from a first position behind the fascia and having a foot with an exterior profile inwardly tapered in the first and second lateral directions and removably received within the first receiving cavity with the exterior profile in contact with the inside profile of the cavity along respective portions intersected by the first and second planes.

In at least another aspect, a method for assembling a bezel unit with a base unit installed in an article includes inserting a foot of a first attachment leg extending from a first position on the bezel unit into a first receiving cavity including by movement of the bezel unit in a first direction and moving the bezel unit in a second direction normal to the first direction. Moving the bezel in the second direction causes mutual engagement between an exterior profile of the foot with an inside profile of the cavity, both the exterior profile of the foot and the inside profile of the cavity tapering inwardly in the second direction along first and second planes positioned normal to each other and intersecting along an axis extending in the second direction. The mutual engagement between the first exterior profile and the inside profile aligns the bezel unit with the base unit with respect to the first and second planes.

These and other features, advantages, and objects of the present device will be further understood and appreciated by those skilled in the art upon studying the following specification, claims, and appended drawings.

DETAILED DESCRIPTION OF EMBODIMENTS

Figure 1:
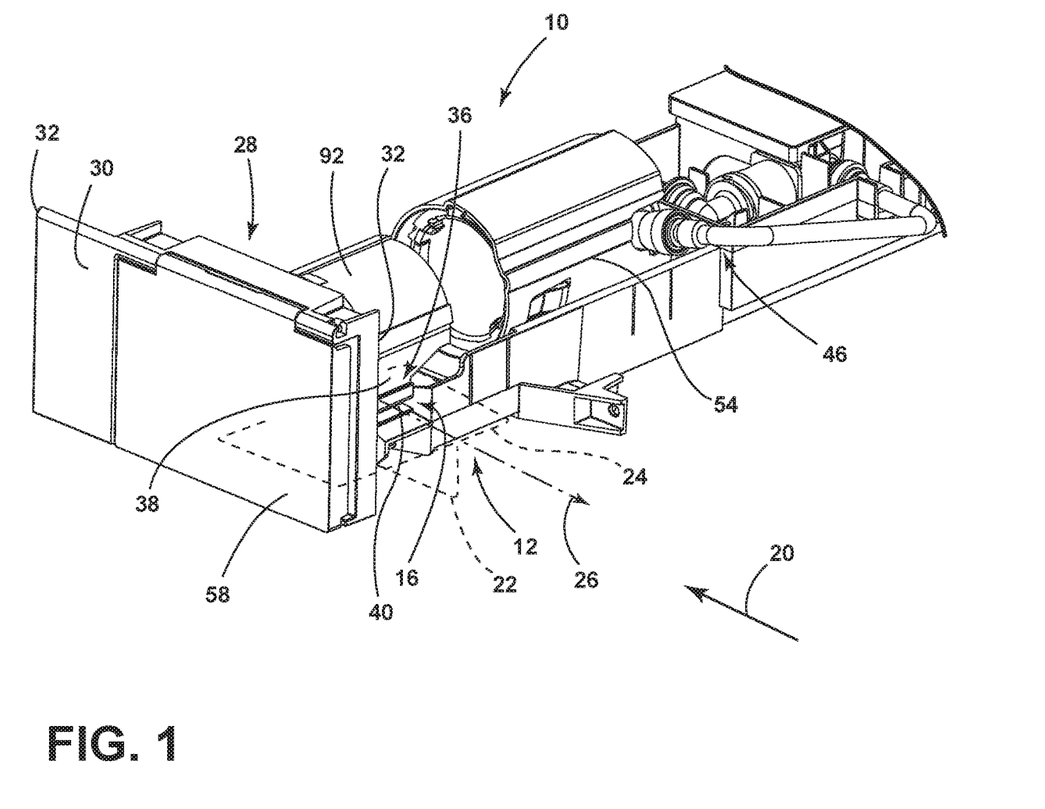
FIG. 1 is a front-perspective view of a filter housing assembly according to an aspect of the disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIG. 1, reference numeral 10 generally designates a filter housing assembly. Housing assembly 10 includes a base unit 12 configured for supporting a removable filter 14 (FIG. 14). The base unit 12 defines a first receiving cavity 16 having an inside profile 18 inwardly tapered in a first lateral direction 20 in first and second planes 22,24 positioned normal to each other and intersecting along an axis 26 extending in the first lateral direction 20. Housing assembly 10 further includes a bezel unit 28 having a front fascia 30 extending generally parallel to the first plane 22 to a first edge 32. The fascia 30 defines a filter opening 34 spaced inwardly from the first edge 32.

The bezel unit 28 further defines a first attachment leg 36 extending from a first position inward of the first edge 32 and having a foot 40 with an exterior profile 42 inwardly tapered in the first and second planes 22,24 and removably received within the first receiving cavity 16 with the exterior profile 42 in contact with the inside profile 18 of the cavity 16 along respective portions intersected by the first and second planes 22,24.

Figure 2:
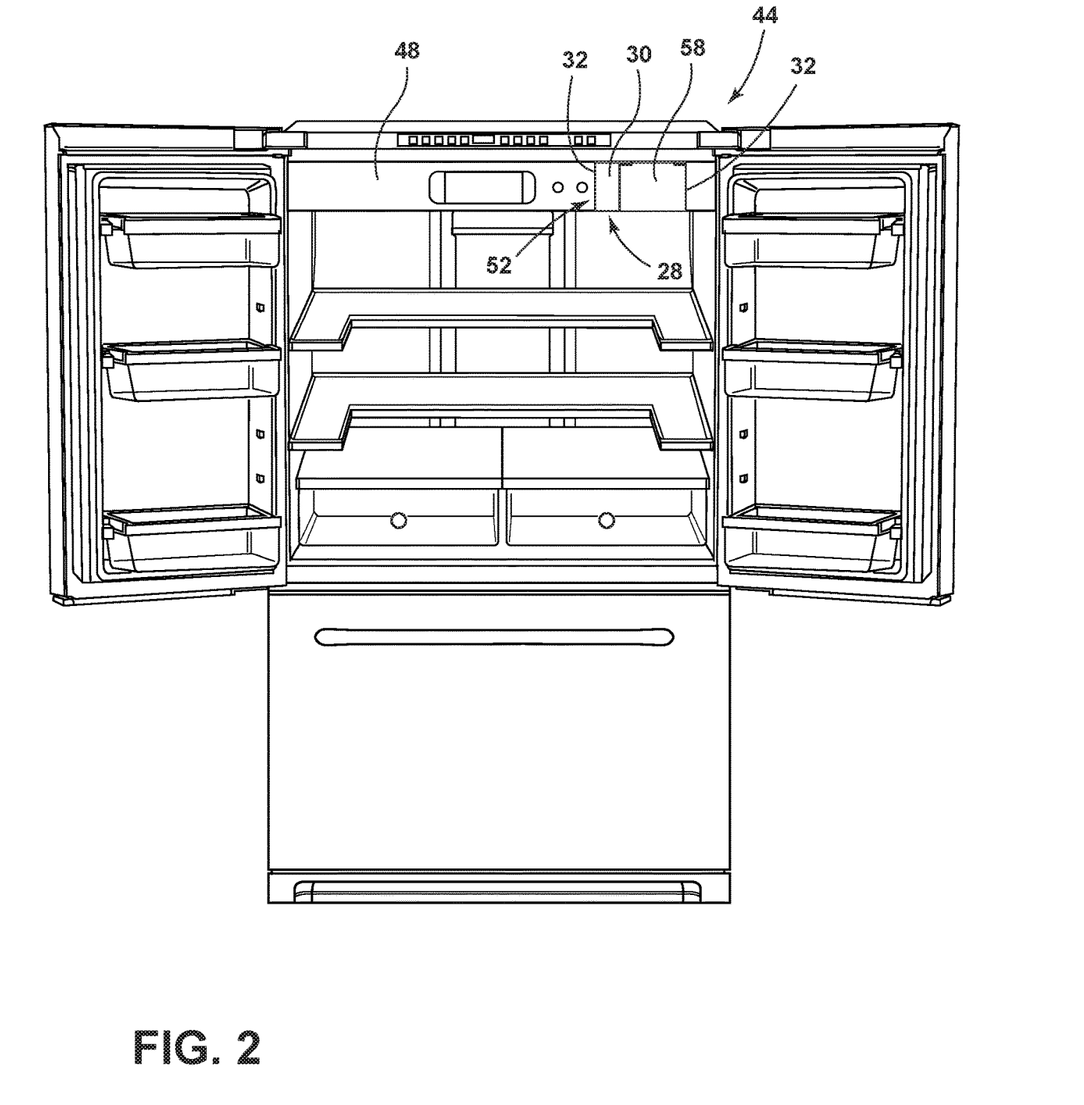
FIG. 2 is a front view of a refrigerator including the filter housing assembly.

As shown in FIG. 2, housing assembly 10 can be included in a refrigerator 44 to retain the filter 14 (FIG. 3) in an operably-assembled position therein with the filter 14 in communication with a water supply 46 for dispensing filtered water and/or use in an integrated ice maker. In the illustrated example, refrigerator 44 can be a built-in type refrigerator in which the outer wrapper 51 does not extend through the entire height of refrigerator 44. In this respect, the refrigerator 44 can include an upper face plate 48 that extends upwardly from outer wrapper 51 to fully enclose the area occupied by refrigerator 44, when installed, and to obscure any components positioned on top of wrapper. In particular, housing assembly 10 can be mounted above wrapper 51 in a position rearward of face plate 48 (with portions thereof optionally positioned behind face plate 48, as needed. In further examples, the fact plate 48 can include various controls for the function of refrigerator and can obscure the related electronic circuitry and other components therein. As shown face plate 48 can extend only partially across the width of refrigerator 44, leaving a gap 52 along one side. The positioning of gap 52 can correspond with the location of assembly 10 within component housing 48. As such, the fascia 30 included with assembly 10 fits within gap 52 to conceal filter 14 while allowing access to the space behind face plat 48 for removal and/or installation of filter 14, as needed, in an arrangement described further below. In an alternative arrangement, a component housing can be affixed with the inner liner 50 and/or can be at least partially defined thereby (such as the by the attachment of the component housing with liner 50 enclosing an open side thereof). In such an arrangement, the component housing can retain filter housing assembly 10 and can provide an opening therein, in which fascia 30 can be positioned.

Figure 3:
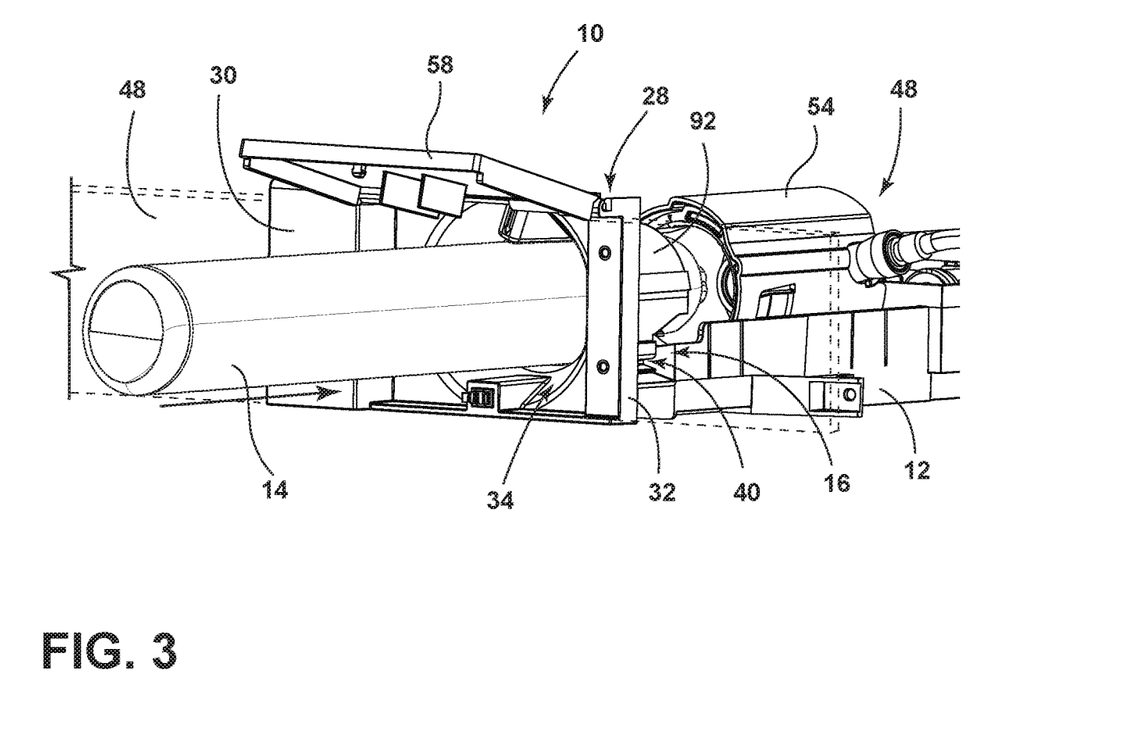
FIG. 3 is a front perspective view of the filter housing assembly receiving a removable filter unit therein.

As further shown in FIG. 1, assembly 10 includes a filter holder 54 defining an interior 56. In this manner, the base unit 12 is configured for supporting the removable filter unit 14 by assembly of the filter unit 14 within the filter holder 54. Within the interior 56, filter holder 54 includes the fittings and seals used to couple the water supply 46 of refrigerator 44 with the filter unit 14 such that assembly of the filter unit 14 within filter holder 54 in an engaged position therewith coupled filter unit 14 with the water supply 46, as discussed above. As shown in FIG. 3, fascia 30 aligns with filter holder 54 and includes a door 58 that is alternately moveable between an open position (FIG. 3) and a closed position to allow removal and/or assembly of filter unit 14 with filter holder and to conceal the filter unit 14 when in place within filter holder 56. As assembly 10 is enclosed within housing 48, the closure of door 58 results in filter unit 14 being contained within housing 48 and being generally concealed from view.

Because of the relative size of fascia 30 compared to base unit 12 and filter holder 54 and the nature of the assembly of base unit 12 with refrigerator 44, including within housing 48, it may be necessary to assemble fascia 30 with base unit 12 in a condition where the attachment interface between fascia 30 and base unit 12 may be concealed from view, including by the outwardly-facing portions of fascia 30. In particular, as discussed above, the edges 32 of fascia 30 may be disposed laterally outward of the attachment legs 36 and the cavities 16 within which attachment legs 36 are received when the two features are in a generally aligned pre-assembly position. In this manner, cavities 16 and attachment legs 36 are mutually configured such that cavities 16 an receive attachment legs 36 in relatively large range of potential positions in an initial assembly step and to guide attachment legs 36 (and, accordingly, bezel unit 28) into a more precisely aligned position in which bezel unit 28 becomes coupled with base unit 12 in the desired position with respect thereto. Further, because bezel unit 28 is affixed within housing 48 prior to such assembly, the coupling and resulting locating of bezel unit 28 with respect to base unit 12 properly aligns bezel unit 28 with respect to the designated opening 52 in housing 48 and aligns bezel unit in the desires position with respect to filter holder 54, as shown in FIG. 3.

To achieve the above-described self-locating of bezel unit 28 with respect to base unit 12, the base unit 12, as discussed above, defines the receiving cavity 16 (of which there may be two, such cavities 16 being generally similarly configured and both indicated by reference numeral 16 and referred to both individually and collectively unless otherwise noted) with the inside profile thereof being inwardly tapered in the first lateral direction 20 in both the first and second planes 22,24. As discussed above, the first and second planes 22,24 are positioned normal to each other and intersect along axis 26, which extends in the first lateral direction. As shown in detail in FIGS. 4 and 5, the bezel unit 28 defines the above-described attachment leg 36 (of which there may be two, such attachment legs 36 being generally similarly configured and both indicated by reference numeral 36 and referred to both individually and collectively unless otherwise noted) extending from respective position 38 behind the fascia 30. Each such attachment leg 36 includes a foot 40 with an exterior profile 42 that is also inwardly tapered in the first lateral direction 20 to generally match the inward taper of inside profile 18 of the cavity 16 within which it is received. In this manner, the foot 40 is removably received within the cavity 16 with the exterior profile 42 of the foot 40 at least partially in contact with the inside profile 18 of the cavity 16 along respective portions intersected by the first and second planes 22,24, as depicted in the cross-sections of FIGS. 4 and 5, respectively.

As can be seen in the referenced detail views, by being "tapered in the first lateral direction 20," as described herein, both the cavity 16 and the foot 40 are indicated as decreasing in width with movement of a theoretical reference point along the feature in direction 20. In the illustrated example, both the cavity 16 and the foot 40 include surfaces (as discussed further below) intersection respectively by each of the first and second planes 22,24, such surfaces being positioned relative to each other at an angle disposed remote from the relevant feature (cavity 16 or foot 40) in direction 20. Such an angle can be between about 15° and about 45° in an example and in one embodiment about 28°. In other examples, the taper can be realized by a general rounding (i.e. parabolic, semi-oval, semicircle, or the like) in one or more directions thereof or combinations of straight angled and rounded surfaces so long as the general narrowing in direction 20 is realized along a portion of the feature in question.

Figure 4:
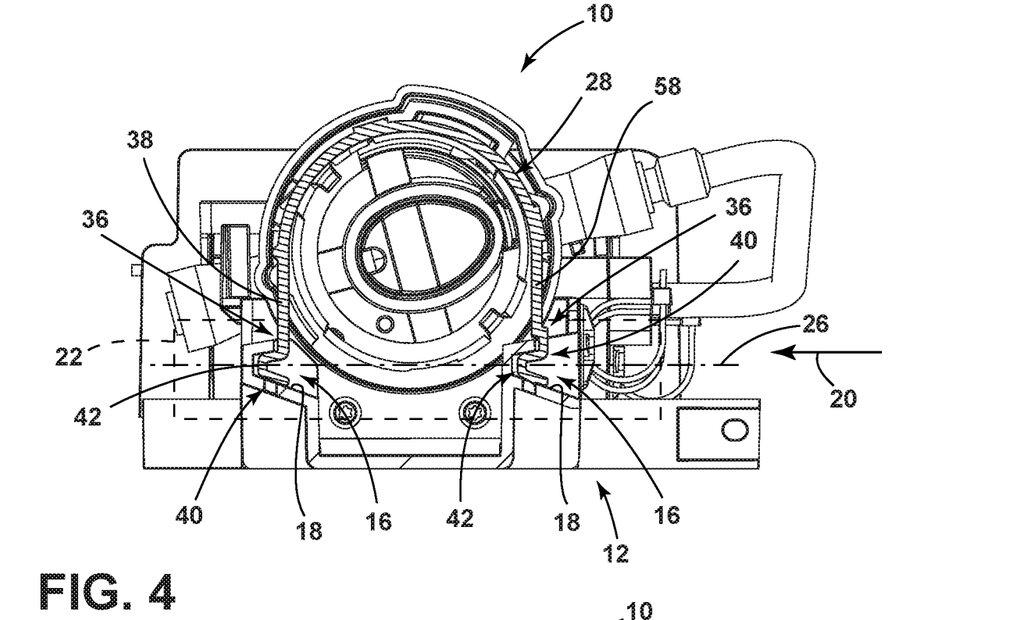
FIG. 4 is a front cross-sectional view of the filter housing assembly.

As can be seen in FIG. 4, the receiving cavity 16 further defines a slot 59 open on a first side (i.e. an upper side in the orientation of FIG. 4) of the cavity 16 with the inside profile 18 of cavity 16 tapering inwardly in the first lateral direction 20 extending away from the slot 59. The attachment leg 36 includes an extension portion 60 extending through the slot 59 to couple the foot 40 with the remaining portions of bezel unit 28 with foot 40 positioned within cavity 16. In this manner, the exterior profile 42 of the foot 40 inwardly tapers in the first direction 20 moving away from the extension portion 60.

Figure 5:
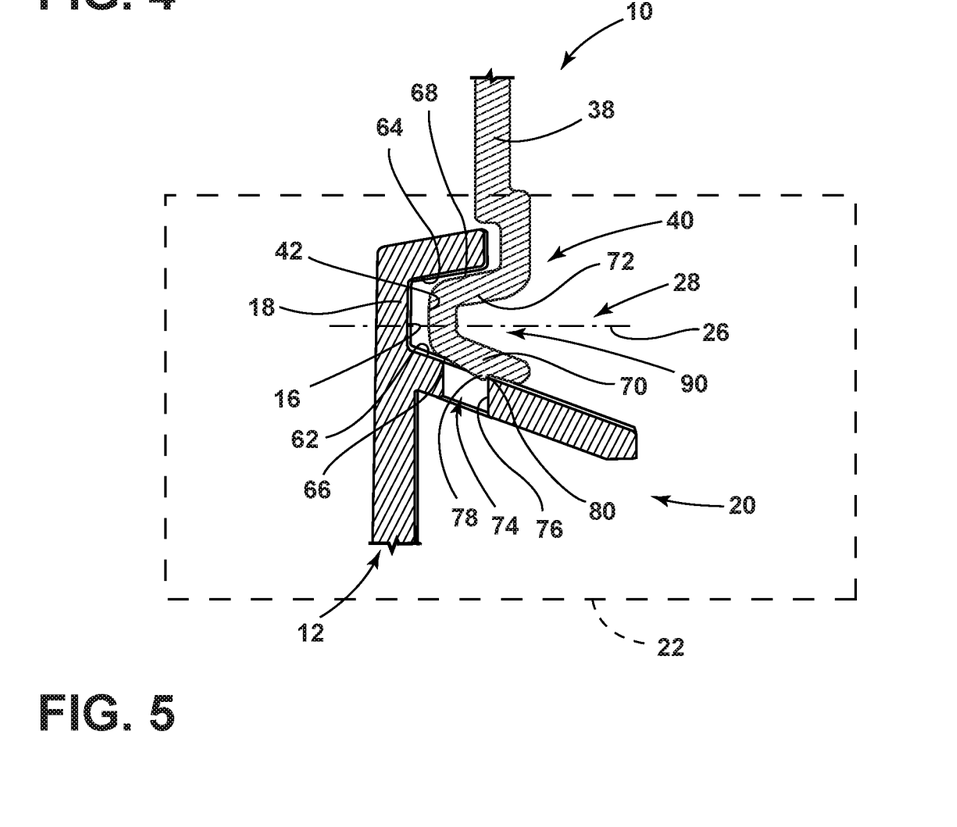
FIG. 5 is a front cross-sectional detail view of a portion of the filter housing assembly.

As shown in greater detail in FIG. 5, cavity 16 includes first and second interior surfaces 62,64 defining respective portions of the inside profile 18. The first and second interior surfaces 62,64 define the inward taper of inside profile 18 in the first lateral direction 20 along the first plane 22. Similarly, foot 40 includes first and second exterior surfaces 66,68 that define respective portions of the exterior profile 42. The first and second exterior surfaces 66,68 contact the first and second interior surfaces 62,64 along at least portions thereof such that the matching portions of the profiles 18,42 thusly defined locate bezel unit 28 with respect to base unit 12 in the vertical direction (i.e. normal to direction 20 along plane 22).

In the illustrated embodiment, the first and second exterior surfaces 66,68 of foot 40 are disposed on first and second cantilever sections 70,72 of foot 40 that are relatively thin (e.g., 2 mm to 5 mm) elements that extend planar with surfaces 62,64. In this manner, the contact between first and second exterior surfaces 66,68 and the first and second interior surfaces 62,64, respectively, includes inward deflection of the first and second cantilever sections 70,72 relative to each other. In connection with such arrangement, the first interior surface 62 of cavity 16 includes a first detent 74 therein, the detent 74 defining a first edge 76 within a portion of surface 62. Correspondingly, the first exterior surface 66 of foot 40 includes a first pawl 78 defining a first ridge 80 that extends over the first edge 76 in to oppose movement of foot 40 within cavity 16 opposite the first direction 20 to, thusly, retain attachment leg 36 in the above-described coupled relationship with cavity 16. In this manner, the inward deflation of the cantilever section 70 on which pawl 78 is included helps to keep pawl 78 disposed within detent 74, including during small movements of bezel unit 28 with respect to base unit 12.

Figure 6:
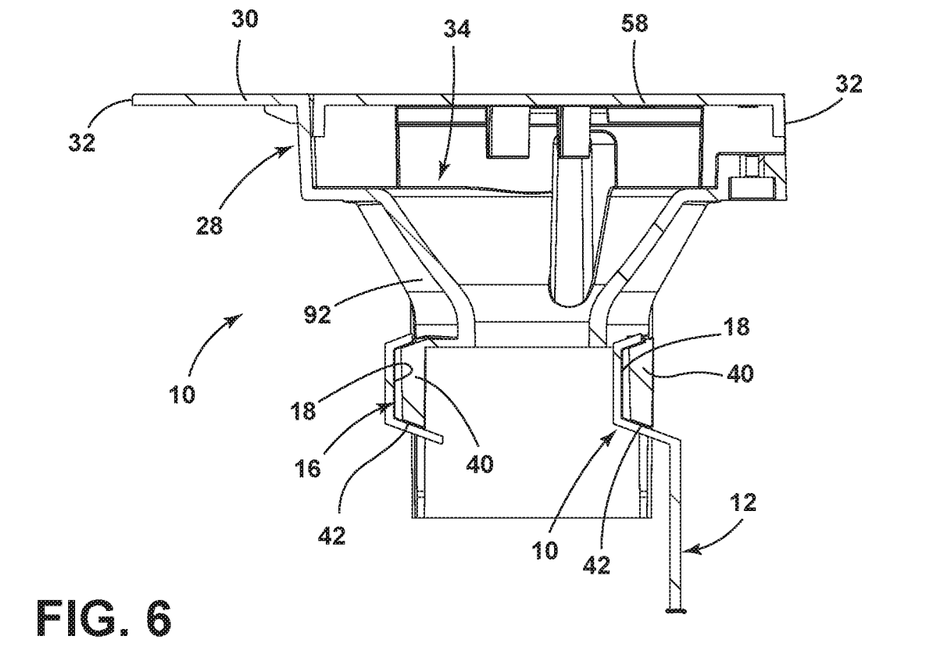
FIG. 6 is a bottom cross-sectional view of the filter housing assembly.
Figure 7:
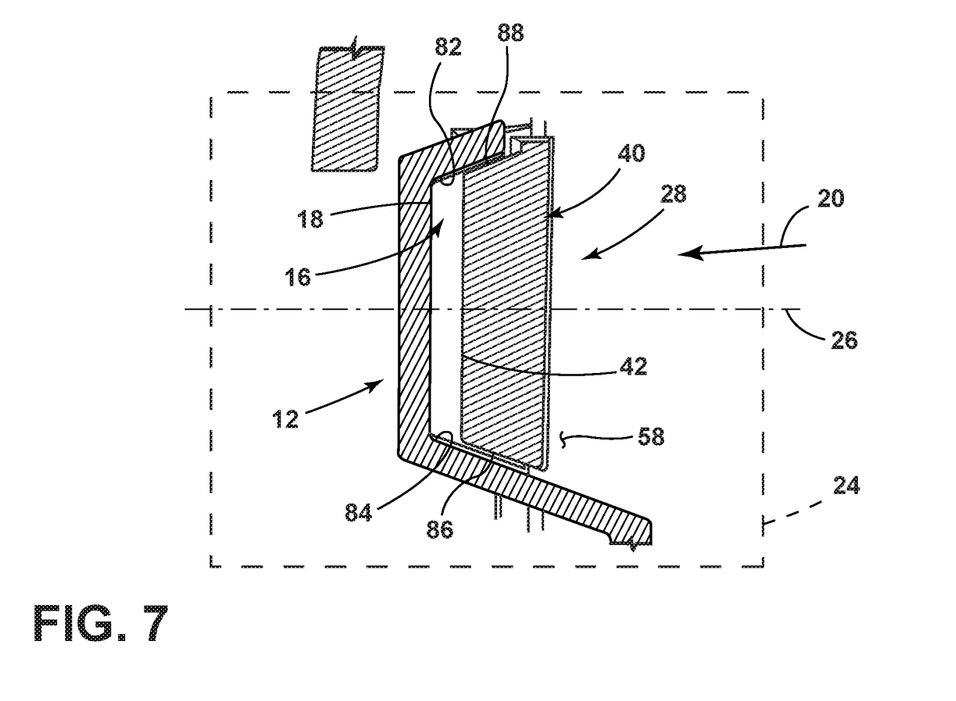
FIG. 7 is a bottom cross-sectional detail view of a portion of the filter housing assembly.
Figure 8:
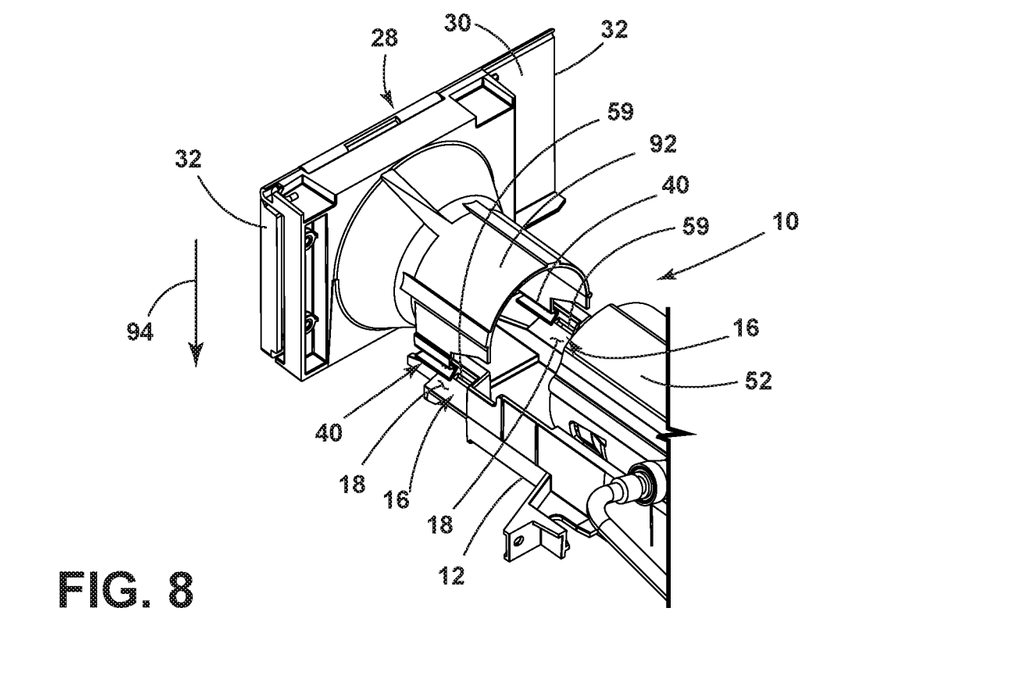
FIG. 8 is a back-perspective view of the filter housing assembly during an assembly step thereof.

As shown in FIG. 6, and in further detail in FIG. 7, cavity 16 further includes third and fourth interior surfaces 82,84 that define respective portion of the inside profile 18. The third and fourth interior 82,84 surfaces define the inward taper of inside profile 18 in the first lateral direction 20 along the second plane 24. In connection with this arrangement, foot 40 includes third and fourth exterior surfaces 86,88 that contact the third and fourth interior surfaces 82,84 along at least portions thereof. As shown in FIG. 4, foot 40 is defined by a portion of the attachment leg 36 that extends along a recursive path, thusly defining the opposed cantilever sections 70,72, discussed above. In this respect, the third and fourth exterior surfaces 86,88 are defined along opposed outside edges of the portion of the attachment leg that surround a generally hollow interior 90 of the foot 40 (the inward flexing of first and second cantilever sections 70,72 displacing at least one of the cantilever sections 70,72 inwardly with respect to interior 90.

As discussed above, base unit 12 can define two cavities 16 according to the description above, such cavities being disposed on opposing lateral sides of filter holder 54. As further discussed above, bezel unit 28 can define two attachment legs 36 according to the description above, with such attachment legs 36 being disposed in a spaced apart manner in direction 20 to respectively align with the oppositely positioned cavities 16, as shown in the figures. In this manner, fascia 30 may define opposing lateral edges 32 with both attachment legs 36 being inwardly disposed with respect to both edges 32 such that the fascia 30 overlies both attachment legs 36 and both cavities 16 in directions parallel with the first plane 22. In the illustrated embodiment, wherein the base unit 12 further includes the above-described filter holder 54 defining interior 56 configured for supporting the removable filter unit 14, the bezel unit 28 can further include a shroud 92 extending from the opening 34 within fascia 30 and positioned behind door 58. As shown in FIGS. 1 and 4, the shroud 92 defines an interior that at least partially aligns with the interior 56 of the filter holder 54 so that filter unit 14 can be positioned through shroud 92 in an aligned position with filter holder 54. As can further be seen, attachment legs 36 extend from the shroud 92.

Figure 9:
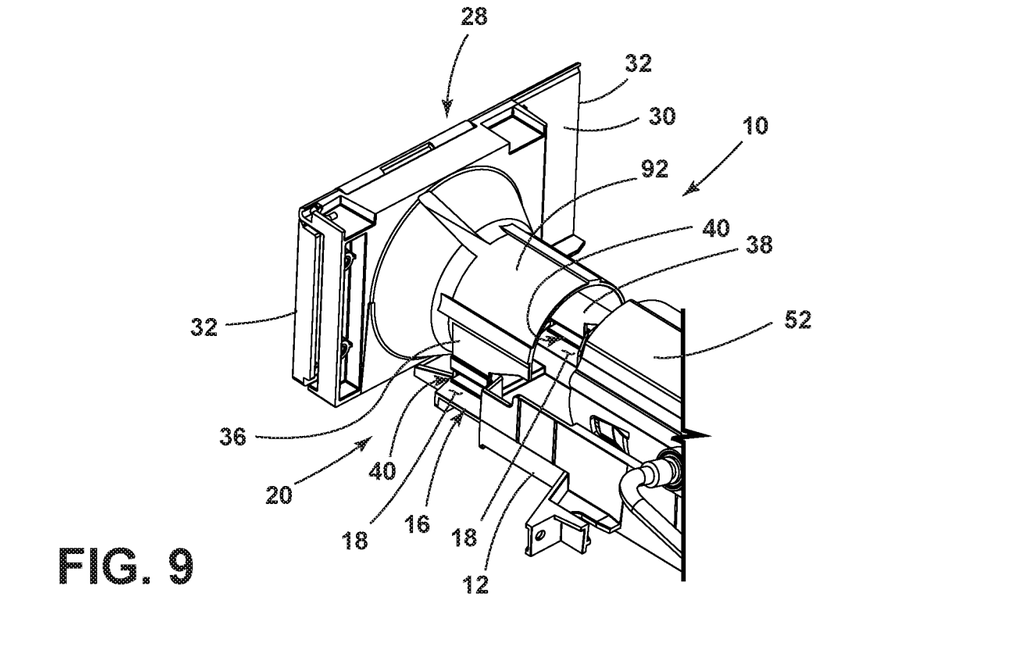
FIG. 9 is a back-perspective view of the filter housing assembly during a further assembly step thereof.

Turning to FIGS. 8-12, the above-mentioned assembly and alignment of bezel unit 28 with base unit 12 is shown in sequence in accordance with a method for assembling bezel unit 28 with a base unit 12, including when base unit 12 is installed in an article, which in an embodiment can include being assembled within housing 48 of refrigerator 44. In general, the assembly method includes inserting foot 40 of attachment leg 36, which extends from the bezel unit 28 into a first receiving cavity 16 including by movement of the bezel unit 28 in a downward vertical direction 94, as indicated in FIG. 6. Subsequently, the bezel unit 28 is moved in the above-discussed first direction 20, as indicated in FIG. 9, that is normal to direction 94. According to the method, moving the bezel unit 28 in the first direction 20 causes mutual engagement between the above-described exterior profile 42 of the foot 40 with the inside profile 18 of the cavity 16. As discussed above, both the exterior profile 42 of the foot 40 and the inside profile 18 of the cavity 16 taper inwardly in the first direction 20 along first and second planes 22,24 such that the mutual engagement between the exterior profile 42 and the inside profile 18 align the bezel unit 28 with the base unit 12 with respect to the first and second planes 22,24. As discussed above, the article in which bezel unit 28 is assembled according to the method can be a refrigerator with the base unit 12 configured for supporting the removable filter unit 14 within the refrigerator 44 including within component housing 48.

As discussed above, bezel unit 28 includes front fascia 30 extending past the attachment leg 36 in directions parallel with the first plane 22 such that the foot 40 of the attachment leg 36 is concealed from view of a user when inserting the foot 40 into the first receiving cavity 16, including by movement in direction 94. The method, as described herein is useable, in one example to assemble bezel unit 28 with base unit 12 when base unit 12 is mounted within housing 48 coupled in the refrigerator 44 adjacent the inner liner 50 of the refrigerator. In this manner, the fascia 30 of the bezel unit 28 extends within opening 52 in the housing 48 when the outside profile 42 of the foot 40 is engaged with the inside profile 18 of the first receiving cavity 16.

Figure 10:
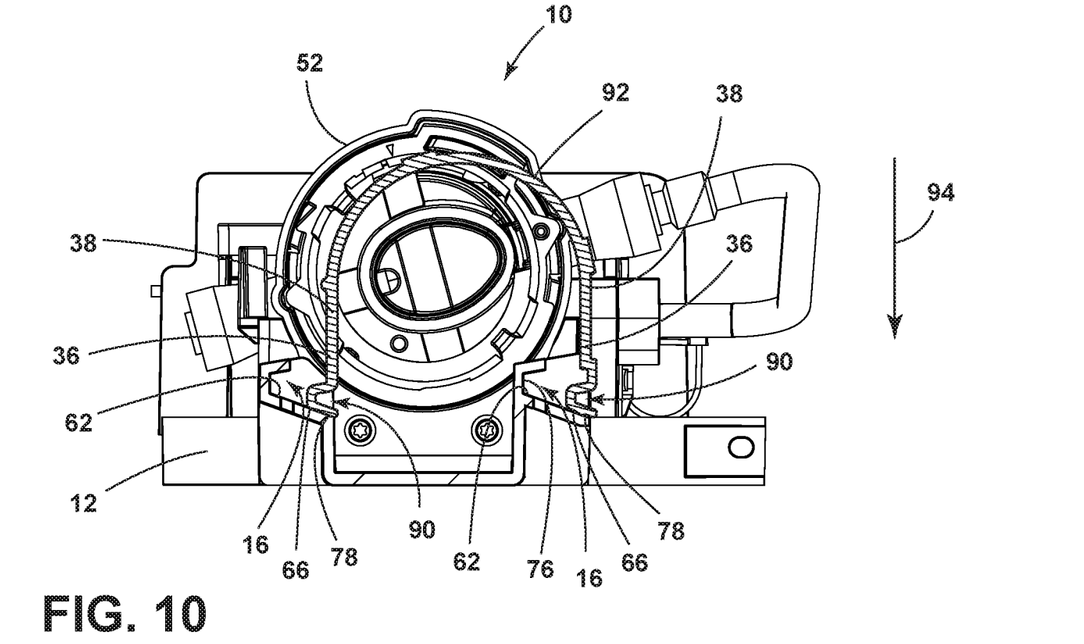
FIG. 10 is a front cross section view of the filter housing assembly during a further assembly step thereof.
Figure 11:
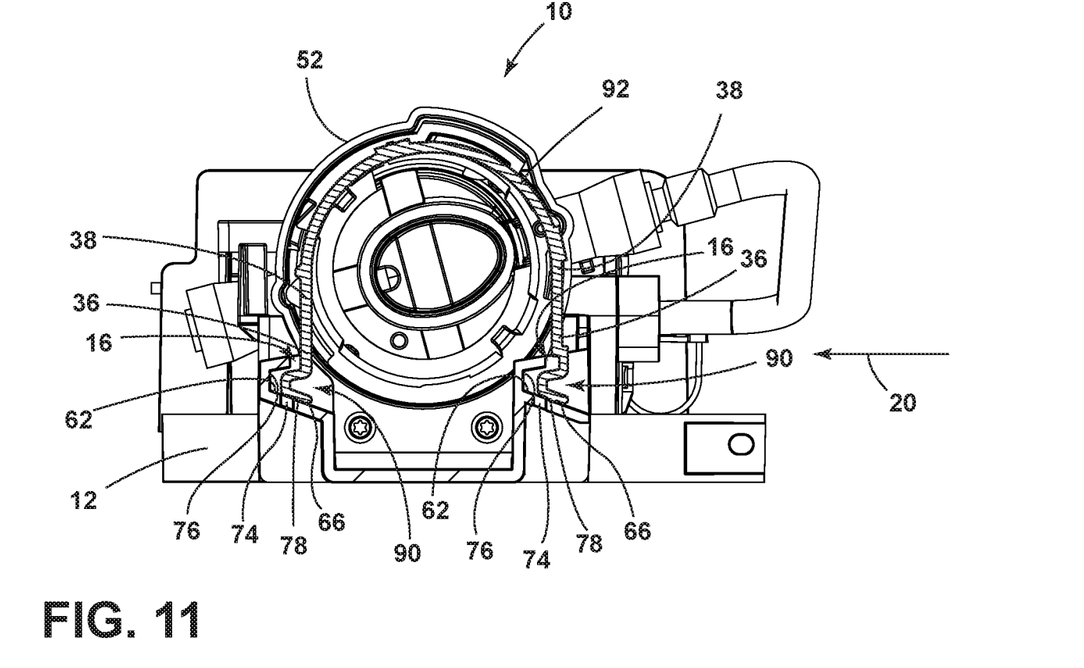
FIG. 11 is a front cross section view of the filter housing assembly during an subsequent assembly step thereof.

As shown in FIG. 10, when bezel unit 28 is moved downwardly to position foot 40 within cavity 16, the above-described first surface 66 of foot 40 may be brought into contact with first surface 62 of cavity 16. Turning to FIG. 11, the subsequent movement of bezel unit 28 in first direction 20 can be such that sliding engagement between the surfaces 66 and 62 can move bezel unit opposite downward vertical direction 94 back toward the desired aligned vertical position between bezel unit 28 and base unit 12 (as shown in FIGS. 4 and 5). In other words, the mutually-engaging inward tapers of cavity 16 and foot 40 serve to locate foot 40 in a desired position within cavity, while providing a sufficient opening to cavity 16 by way of slot 59 that is larger than foot 40, thereby allowing easy initial placement of foot 40 into cavity 16, even when visual confirmation of alignment is not possible (i.e. a blind assembly). It is also noted that similar alignment can be made if foot 40 is above the fully engaged position of FIGS. 4 and 5 by continued movement of foot 40 in direction 94 by sliding contact between the second surface 68 of foot 40 and the second surface 64 of cavity 16, as driven by movement in direction 20.

Further, such movement causes the pawl 78 to snap into an engaged position with detent 74 such that the first ridge 80 contacts the first edge 76 of the detent 74. The flexible nature of foot 40 achieved by configuring surfaces 66,68 on cantilevered sections 70,72, as discussed further above, allows for compression of foot 40 in direction 94 to allow for pawl 78 to snap into detent 74 (i.e. into the position of FIG. 5) and provides an outward force to maintain pawl 78 in the engaged position with detent 74. In general, the engagement contact of the ridge 80 and the ridge 80 opposes movement of the foot 40 within the receiving cavity 16 opposite the first direction 20 and serves to maintain bezel unit 28 in the installed position with respect to base unit 12 and, therefore within opening 52 of housing 48.

Figure 12:
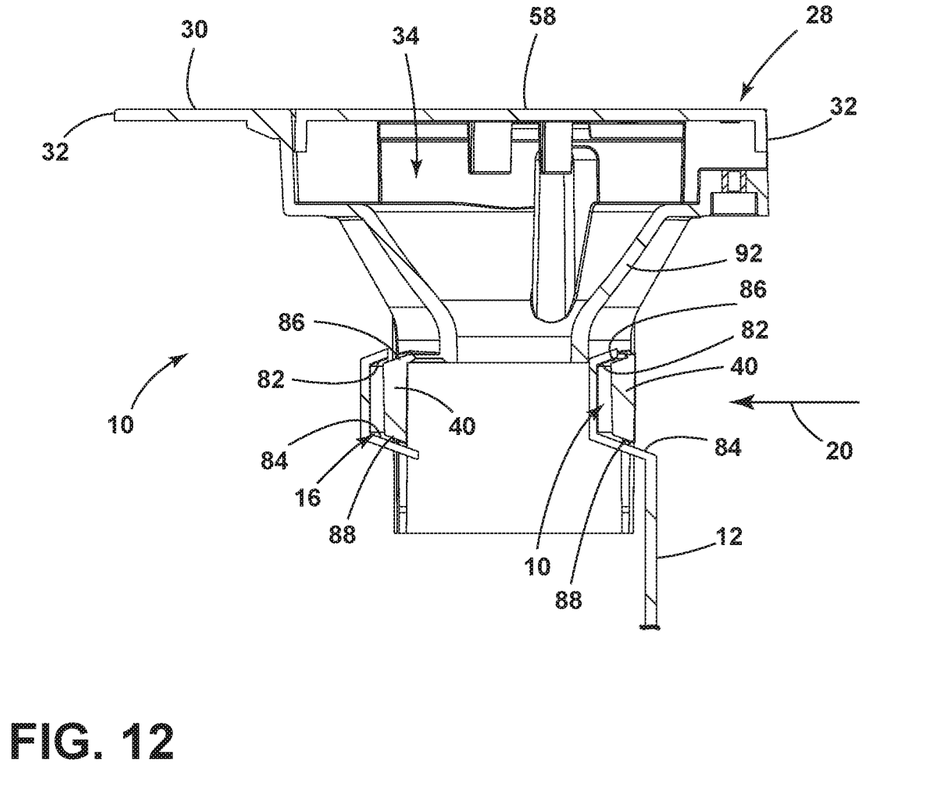
FIG. 12 is a bottom cross section view of the filter housing assembly during a further assembly step thereof.

In a similar manner, as shown in FIG. 12, movement of bezel unit 28 in first direction 20 is further such that sliding engagement between either the third or fourth surfaces 84,86 of foot 40 with the respective surfaces 82,84 of cavity 16 can move bezel unit either forward or backward toward the desired aligned longitudinal position between bezel unit 28 and base unit 12 (as shown in FIGS. 6 and 7). In this manner, bezel unit 28 is also generally self-aligning in an inward or outward direction with respect to opening 52 in housing 48 such that, by proper placement of base unit 12 within housing 48, assembly of bezel unit 28 with base unit, as described herein, can position fascia 30 and/or door 58 in a generally flush position with respect to the adjacent surface of housing 48, for example.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A filter housing assembly, comprising:
 a base unit configured for supporting a removable filter unit, the base unit defining a first attachment foot receiving cavity having an inside profile inwardly tapered in a first lateral direction in first and second planes positioned normal to each other and intersecting along an axis extending in the first lateral direction; and
 a bezel unit having a front fascia extending generally parallel to the first plane to a first edge, the fascia defining a filter opening spaced inwardly from the first edge, the bezel unit further defining a first attachment leg extending from a first position inward of the first edge and having an attachment foot with an exterior profile inwardly tapered in a first lateral direction and removably received within the first attachment foot receiving cavity of the base unit with the exterior profile in contact with the inside profile of the receiving cavity along respective portions intersected by the first and second planes.

2. The filter housing assembly of claim 1, wherein the first receiving cavity further defines a slot open on a first side of the attachment foot receiving cavity with the inside profile tapering inwardly in the first lateral direction extending away from the slot.

3. The filter housing assembly of claim 2, wherein the attachment leg includes an extension portion extending through the slot with the exterior profile of the attachment foot inwardly tapering in the first lateral direction away from the extension portion.

4. The filter housing assembly of claim 1, wherein:
the attachment foot receiving cavity includes first and second interior surfaces defining respective portions of the inside profile, the first and second interior surfaces being inwardly tapered in the first lateral direction along the first plane; and
the attachment foot includes first and second exterior surfaces defining respective portions of the exterior profile, the first and second exterior surfaces contacting the first and second interior surfaces along at least portions thereof.

5. The filter housing assembly of claim 4, wherein:
the first and second exterior surfaces of the foot are disposed on first and second cantilever sections of the foot, respectively; and
the first and second exterior surface contacting the first and second interior surfaces includes inward deflection of the first and second cantilever sections relative to each other.

6. The filter housing assembly of claim 4, wherein:
the first interior surface includes a first detent therein defining a first edge; and
the first exterior surface includes a first pawl defining a first ridge extending over the first edge in a second direction opposite the first direction.

7. The filter housing assembly of claim 4, wherein:
the attachment foot receiving cavity further includes third and fourth interior surfaces defining respective portion of the inside profile, the third and fourth interior surfaces being inwardly tapered in the first lateral direction along the second plane; and
the attachment foot includes third and fourth exterior surfaces contacting the third and fourth interior surfaces, respectively, along at least portions thereof.

8. The filter housing assembly of claim 7, wherein:
the attachment foot is defined by a portion of the attachment leg that extends along a recursive path; and
the third and fourth exterior surfaces are defined along opposed outside edges of the portion of the attachment leg that surround a generally hollow interior of the attachment foot.

9. The filter housing assembly of claim 1, wherein:
the base unit further defines a second attachment foot receiving cavity with an inside profile inwardly tapered in the first lateral direction along the first and second planes; and
the bezel unit further defines a second edge opposite the first edge a second attachment leg extending from a second position inward of the second edge and having a second attachment foot with an exterior profile inwardly tapered in the first and second lateral directions and removably received within the second receiving cavity with the exterior profile in contact with the inside profile of the receiving cavity along respective portions intersected by the first and second planes.

10. The filter housing assembly of claim 9, wherein the fascia overlies both the first and second attachment legs in directions parallel with the first plane.

11. The filter housing assembly of claim 1, wherein:
the base unit further includes a filter holder defining an interior, the base unit being configured for supporting the removable filter unit within the interior of the filter holder; and
the bezel unit further includes a shroud extending from the opening, the shroud defining an interior that at least partially aligns with the interior of the filter holder.

12. The filter housing assembly of claim 11, wherein the first attachment leg extends from the shroud.

13. The filter housing assembly of claim 11, further including a door mounted on the bezel unit opposite the shroud and extending over the opening in a closed position.

14. A refrigerator, comprising:
a filter housing assembly mounted with the refrigerator and including:
a filter support unit mounted within the component housing adjacent the opening and configured for retaining a removable filter unit, the support unit defining a first attachment foot receiving cavity having an inside profile inwardly tapered in a first lateral direction in first and second planes positioned normal to each other and intersecting along an axis extending in the first lateral direction; and
a bezel unit having a front fascia extending generally parallel to the first plane within the opening of the component unit, the fascia defining a filter opening in communication with a portion of the filter support unit, the bezel unit further defining a first attachment leg extending from a first position behind the fascia and having an attachment foot with an exterior profile inwardly tapered in the first direction and removably received within the first attachment foot receiving cavity with the exterior profile in contact with the inside profile of the receiving cavity along respective portions intersected by the first and second planes.

15. The refrigerator of claim 14, further including an outer wrapper and a face plate mounted to the refrigerator external to the outer wrapper, wherein:
the front fascia is mounted to the refrigerator external to the outer wrapper adjacent to the face plate.

16. The refrigerator of claim 15, wherein the filter housing assembly further includes a door rotatably coupled with the bezel unit and moveable between an open and closed position, the door extending generally co-planar with the face plate when in the closed position.

17. The refrigerator of claim 14, wherein the first receiving cavity of the filter housing assembly further defines a slot open on a first side of the receiving cavity with the inside profile tapering inwardly in the first lateral direction extending away from the slot.

18. The refrigerator of claim 17, wherein the attachment leg of the filter housing assembly includes an extension portion extending through the slot with the exterior profile of the foot inwardly tapering in the first lateral direction away from the extension portion.

19. The refrigerator of claim 4, wherein:
the receiving cavity includes first and second interior surfaces defining respective portions of the inside profile, the first and second interior surfaces being inwardly tapered in the first lateral direction along the first plane; and
the attachment foot includes first and second exterior surfaces defining respective portions of the exterior profile, the first and second exterior surfaces contacting the first and second interior surfaces along at least portions thereof.

20. The filter housing assembly of claim 1, further comprising a refrigerator including an outer wrapper and a face plate mounted to the refrigerator external to the outer wrapper, wherein:

the filter housing assembly is mounted within the refrigerator, the front fascia being mounted to the refrigerator external to the outer wrapper adjacent to the face plate.

\* \* \* \* \*